United States Patent [19]

Pleso

[11] Patent Number: 5,717,317
[45] Date of Patent: Feb. 10, 1998

[54] CIRCUIT FOR ENERGIZING ELECTROLUMINESCENT PANEL

[75] Inventor: Mark F. Pleso, Sharon, Pa.

[73] Assignee: Telxon Corporation, Akron, Ohio

[21] Appl. No.: 703,723

[22] Filed: Aug. 27, 1996

[51] Int. Cl.$^6$ .................................................. G09G 3/10
[52] U.S. Cl. .................................................. 323/222
[58] Field of Search .................. 315/169.3, 169.4, 315/200 R, 205, 219, 226, 224, 307, 291, 169.1; 323/222–223

[56] References Cited

U.S. PATENT DOCUMENTS 5,345,146  9/1994  Koenck et al. .................. 315/169.3

*Primary Examiner*—Aditya Krishnan
*Attorney, Agent, or Firm*—Watts, Hoffmann, Fisher & Heinke Co., L.P.A.

[57] ABSTRACT

A circuit for energizing an electroluminescent panel of a portable data collection device is disclosed. The circuit includes voltage step up circuit and a switching circuit. The voltage step up circuit converts a +5 volt DC signal output from power regulation circuitry of the portable data collection device to a +100 volt essentially constant DC signal. The voltage step up circuit includes a switching regulation integrated circuit chip coupled in series to a toroid inductor. The inductor is coupled through a diode to a smoothing capacitor. The switching circuit converts the +100 volt DC signal to effectively a ±100 volt (200 volts peak-to-peak), 500 Hertz (Hz) signal across electrodes of the electroluminescent panel. The switching circuit includes a 555 IC timer chip coupled to an H bridge configuration of switching transistors.

12 Claims, 2 Drawing Sheets

CIRCUIT FOR ENERGIZING ELECTROLUMINESCENT PANEL

FIELD OF THE INVENTION

This invention relates to a circuit for energizing an electroluminescent panel and, more particularly, to a circuit for energizing an electroluminescent panel utilizing a low voltage direct current power source.

BACKGROUND OF THE INVENTION

Electroluminescent panels are widely used as backlights in a variety of portable data collection devices having visual display screens. An electroluminescent panel consists of a polycrystalline phosphor substrate disposed between thin sheet metal electrodes a few thousandths of an inch apart. One of the electrodes is essentially transparent. The panel functions as a capacitor and relatively uniform light is emitted from the panel when a time varying signal is applied across the electrodes. An alternating current (AC) signal having a peak-to-peak amplitude of 200 volts and a frequency of 500 hertz (Hz) is suitable for energizing a typical electroluminescent panel of a portable data collection device.

Electroluminescent panels used in portable data collection devices must be powered by the devices power source, typically a rechargeable battery pack. A typical portable data collection device includes power regulation circuitry which receives power from the battery pack and outputs a regulated direct current (DC) voltage of +5 volts to energizing circuitry of the device. Thus, the +5 volt DC signal supplied by the power regulation circuitry must be converted to a time varying signal and stepped up to an appropriate peak-to-peak voltage to drive the electroluminescent panel.

Current art electroluminescent panel drive circuits typically utilize a 500 Hz oscillator. The power regulation circuitry +5 volt DC signal is input to the oscillator and an output of the oscillator is coupled to a primary winding of a step up transformer with a center tapped secondary winding. The electrodes of an electroluminescent panel are coupled to respective end taps of the secondary winding. The transformer steps up the 500 Hz signal output by the oscillator to generate a 500 Hz signal that varies between +100 volts and −100 volts. A major disadvantage of such a drive circuit is the large size and weight of the step up transformer. The transformer is necessarily large in size and weight because of the relatively low frequency of the voltage signal being stepped up.

What is needed is an efficient and cost effective circuit to convert a low voltage DC signal to a high voltage time varying signal suitable for energizing an electroluminescent panel of a portable data collection device. What is also needed is a circuit to convert a low voltage DC signal to a high voltage time varying signal suitable for energizing an electroluminescent panel which utilizes small, lightweight components to minimize the size and weight of the portable data collection device.

SUMMARY OF THE INVENTION

A circuit for energizing an electroluminescent panel of a portable data collection device is disclosed. The circuit includes voltage step up circuit and a switching circuit. The voltage step up circuit converts a +5 volt DC signal output from power regulation circuitry of the portable data collection device to a +100 volt essentially constant DC signal. The voltage step up circuit includes a switching regulation integrated circuit chip coupled in series to a toroid inductor. The inductor is coupled through a diode to a smoothing capacitor. The switching circuit converts the +100 volt DC signal to effectively a +100 volt (200 volts peak-to-peak), 500 Hz signal. The switching circuit includes a 555 integrated circuit (IC) timer chip coupled to an H bridge configuration of switching transistors.

The switching regulation IC chip is preferably a MAX1771 chip sold by Maxim Corp. of Sunnyvale, Calif. The switching regulation chip generates a very high frequency output which causes a time varying current flow through the toroid inductor. The current through the inductor is positive for one half of each period, passes through zero and is negative for the other half of each period. When the current flow through the inductor passes through zero, the inductor produces a reverse electromotive force (EMF). The EMF of the inductor is smoothed by the capacitor resulting in an essentially constant +100 volt signal at the connection of a cathode terminal of the diode and a positive plate of the capacitor. Because of the high frequency of the switching regulation IC chip output, the required size of the smoothing inductor is minimized.

The 555 IC timer chip operates to alternately open and close six bipolar junction transistors, four of which are npn transistors and two of which are pnp transistors. The electroluminescent panel includes two electrodes terminating in respective leads. Two of the transistors are coupled to one lead of the electroluminescent panel while another two other of the transistors are coupled to the other lead. By appropriately coupling the output signal of the 555 timer IC chip and an inverted signal of the output signal to base terminals of four of the switching transistors and coupling the +100 volt signal to the emitter of two transistors and the collector of two other transistors, one electrode lead is energized by a substantially square wave waveform varying in magnitude between zero volts and +100 volts and the other electrode lead is energized by a substantially square wave waveform varying in magnitude between zero volts and −100 volts. The two square waves are in synchronization and the frequency of the pulses generated by the 555 timer IC chip is 500 Hz. Since the electroluminescent panel functions as a large capacitor and the frequency of the square waves is 500 Hz and in synchronization, the effective voltage across the panel electrodes is ±100 volts or 200 volts peak-to-peak with a frequency of 500 Hz.

The electroluminescent panel energizing or drive circuit of the present invention is inexpensive and efficient and since the size and weight of the inductor is minimized, the weight added by the circuit to the portable data collection device less than prior art electroluminescent energizing circuits.

These and other advantages and features of this invention will be clearly understood through consideration of the following detailed description of the invention in conjunction with the accompanying drawings.

DETAILED DESCRIPTION

Figure 1:
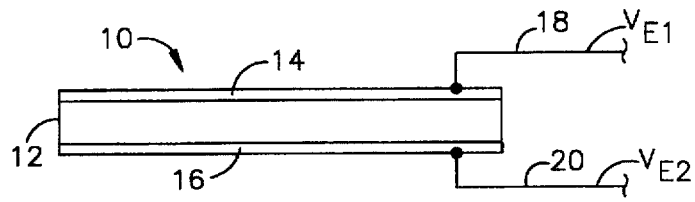
FIG. 1 is a schematic representation of an electroluminescent panel.

An electroluminescent panel, shown generally at 10 in FIG. 1, is used as a backlight for a visual display screen of a portable data collection device (not shown). The panel 10 is comprised of a substrate layer 12 of polycrystalline phosphor sandwiched between a first flat, thin electrode 14 which is nearly transparent and a second flat, thin electrode 16. The electroluminescent panel 10 is positioned in the portable data collection device under the visual display screen. The first transparent electrode 14 faces the display screen such that when the panel is energized, the substrate layer emits a uniform light visible through the transparent electrode and thus the panel functions as a backlight for the display screen. A first conductive lead 18 and a second conductive lead 20 are coupled to respective first and second electrodes 14, 16 and terminate in connectors 22, 24.

Figure 2A:
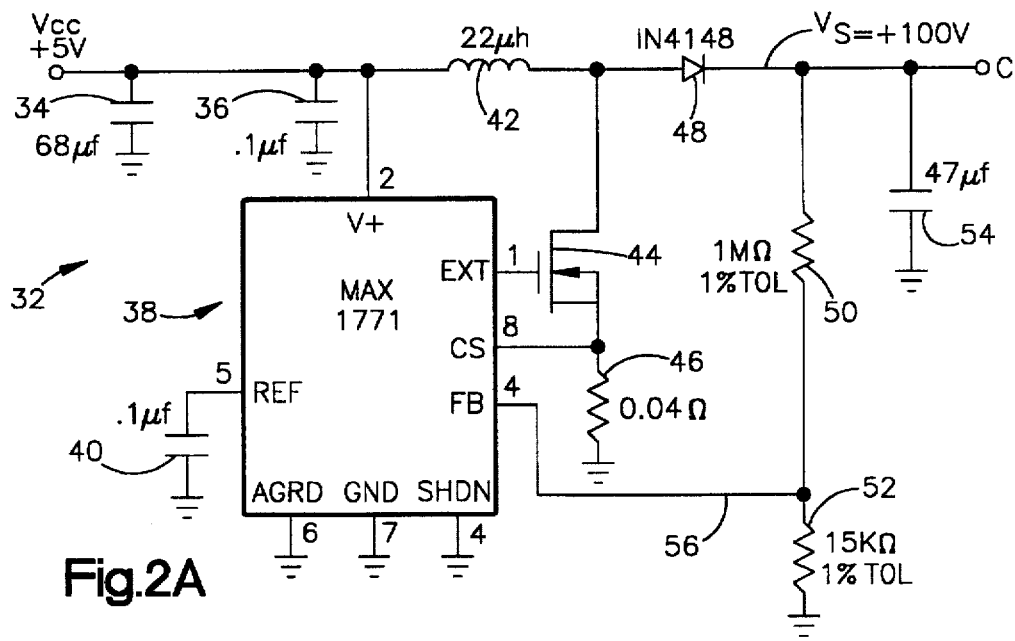
FIG. 2A is a portion of a schematic diagram of an energizing circuit of the present invention for energizing an electroluminescent panel of a portable data collection device utilizing a low voltage DC power source output from power regulation circuitry of the device.
Figure 3:
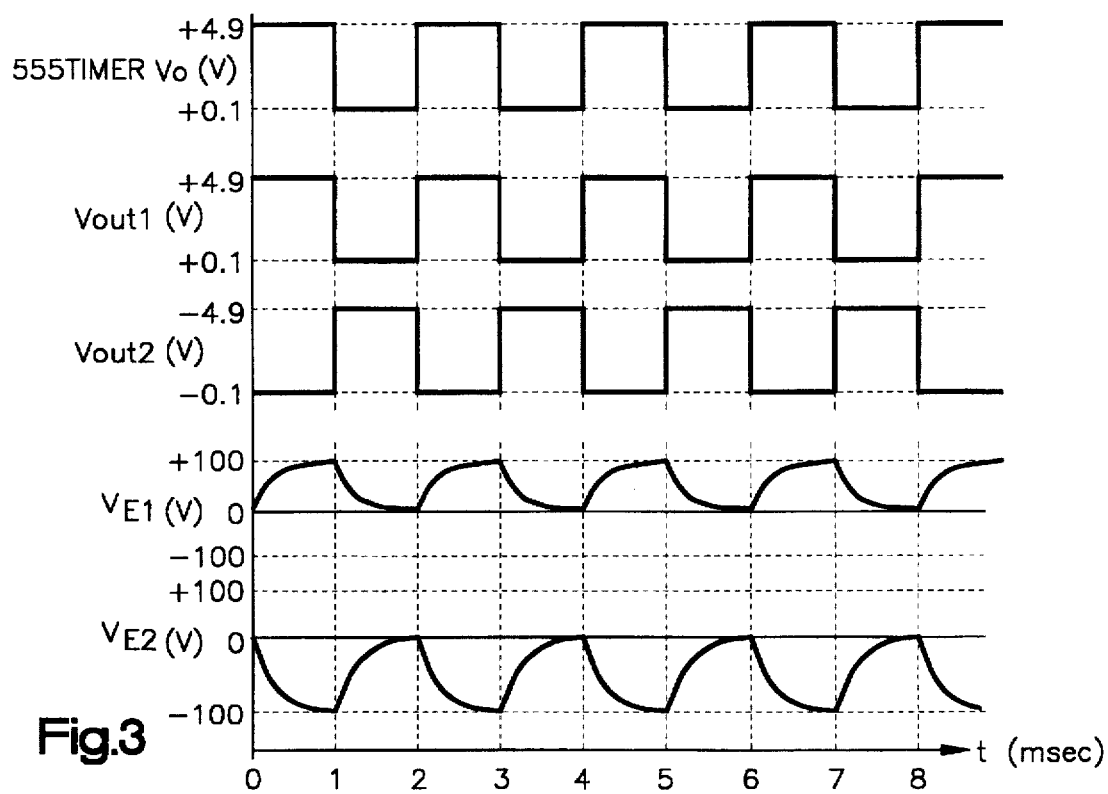
FIG. 3 is a timing diagram of the waveform output of a 555 timer IC chip of the energizing circuit of FIGS. 2A and 2B and a voltage output of the energizing circuit.
Figure 2B:
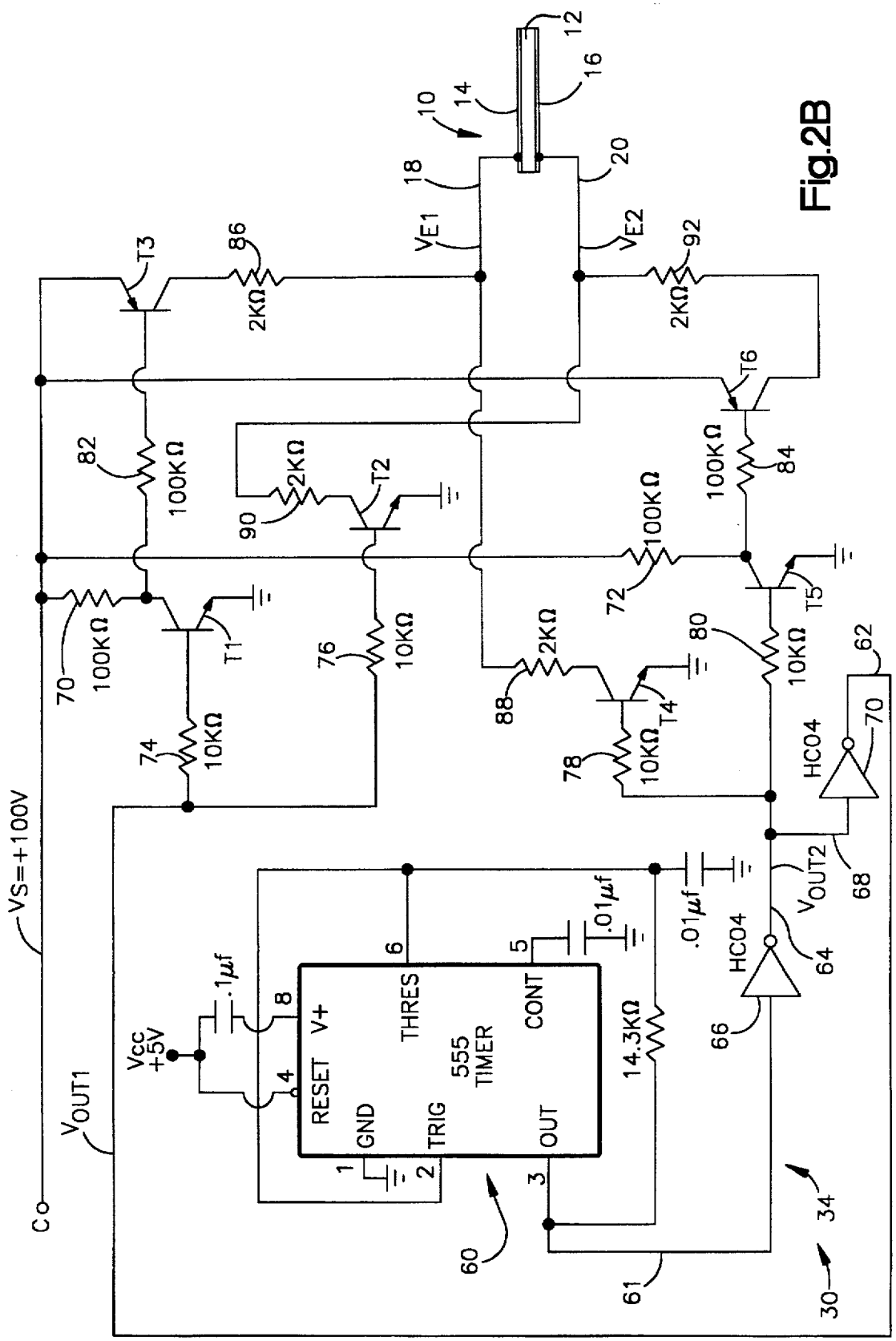
FIG. 2B is a matching portion of the schematic diagram of the energizing circuit of FIG. 2A.

The electroluminescent panel 10 is energized by an energizing circuit of the present invention, shown generally at 30 in FIGS. 2A and 2B, which generates voltages VE1 at lead 18 and VE2 at lead 20. The energizing circuit 30 is powered by a +5 volt DC regulated voltage, labeled Vcc, output by power regulation circuitry (not shown) of the portable data collection device. The energizing circuit 30 includes a voltage step up circuit 32 and a switching circuit 34. The voltage step up circuit 32 converts the Vcc signal to a +100 volt essentially DC signal labeled Vs (stepped up voltage) in FIGS. 2A and 2B. The switching circuit 34 converts the Vs signal to a substantially square wave 500 Hz signal which, at VE1, has a minimum value of zero volts and a maximum value of +100 volts, and, at VE2, has a minimum value of −100 volts and a maximum value of 0 volts. As can be seen in FIG. 3, since the waveforms VE1 and VE2 are synchronized, that is, the maximum value of VE1 (+100 volts) occurs in synchronization with the minimum value of VE2 (−100 volts), the effective signal across the electroluminescent panel 10 is a 200 volt peak-to-peak signal having a frequency of 500 Hz (that is, a period equal to two milliseconds).

Turning to FIGS. 2A and 2B, a +5 volt DC signal, labeled Vcc, is output from power regulation circuitry of the portable data collection device to the voltage step up circuit 32 of the energizing circuit 30. The two filtering capacitors 34, 36 are coupled between Vcc and the V+ input of a switching regulation IC chip 38. The capacitor 34 is a 68 microfarad capacitor while the capacitor 36 is a 0.1 microfarad capacitor. A suitable switching regulation chip 38 is the MAX1771 chip sold by Maxim Corp. of Sunnyvale, Calif. A 0.1 microfarad capacitor 40 is coupled between the reference input of the switching regulation chip 38 and ground. Also coupled to the V+ input of the switching regulation chip 38 is one lead of a 22 microhenry toroid inductor 42.

Coupled to an opposite end of the inductor 42 is a drain terminal of a n-channel depletion type MOSFET 44. The MOSFET 44 should have a low drain-source resistance (rds) and a breakdown voltage of at least 100 volts. A suitable MOSFET is the IRF530 available from International Rectifier Corp. of El Segundo, Calif. A gate terminal of the MOSFET 44 is coupled to the EXT output (External Mosfet Control) of the switching regulation chip 38 while a source terminal is coupled to the CS (Current Sense) output of the chip. The source is coupled through a 0.04 ohm resistor 44 to ground. An opposite end of the inductor 42 is coupled to an anode of a National Semiconductor IN4148 diode 48. A cathode of the diode 48 is coupled to a voltage divider feedback loop comprising a 1 megohm resistor 50 in series with a 15 k ohm resistor 52. The tolerance of resistors 50, 52 is preferably one percent.

The cathode of the diode 48 is also coupled to a 47 microfarad capacitor 54 which is rated to accept a 100 volt charge across its plates. The output voltage, labeled Vs (for stepped up voltage), is substantially +100 volts DC. The voltage divider comprised of the resistors 50, 52 provides that approximately +1.48 volts is fed back to the feedback input of switching regulation chip 38 through a lead 56.

The switching regulation chip 38 generates a very high frequency output, approximately 300 kHz, which causes a time varying current flow through the inductor 42. The current through the inductor 42 is positive for one half of each period, passes through zero and is negative for the other half of each period. When the current flow through the inductor passes through zero, the inductor 42 produces a reverse electromotive force (EMF). The EMF of the inductor 42 is smoothed by the capacitor 54 resulting in an essentially constant Vs of +100 volt. Because of the high frequency of the switch regulation IC chip output, the required size of the inductor 42 is minimized.

Returning to FIG. 2B, the switching circuit 34 of the energizing circuit 30 includes a timing circuit for generating a 500 Hz signal. A suitable timing circuit is a 555 IC timer 60 wired as a free-running astable multivibrator having a frequency of 500 Hz and a duty cycle of 50%. A lead 61 is coupled to output terminal of the timer 60. An inverter 66 is coupled to the lead 61 thereby generating Vout2 at the lead 64. An appropriate inverter is a National Semiconductor HC04. Another lead 68 is coupled between the lead 64 and a second inverter 70 to generate Vout1 at the lead 62. A lead 62 has a voltage waveform, labeled Vout1, having a frequency of 500 Hz and a duty cycle of 50%, that is:

$Vout1$ = +4.9 volts for 50% of each period (555 timer output high)
= +0.1 volt for 50% of each period (555 timer output low)

A lead 64 has a voltage waveform, labeled Vout2, that is the inverse of Vout1, namely, a frequency of 500 Hz and a duty cycle of 50%, wherein:

$Vout2$ = +4.9 volts for 50% of each period (555 timer output high)
= +0.1 volt for 50% of each period (555 timer output low)

The waveforms for Vout1 and Vout2 are shown in FIG. 3.

Six bipolar junction switching transistors T1, T2, T3, T4, T5, T6 are coupled in an "H" switching network configuration. The transistors T1, T2, T4, T5 are npn transistors, while transistors T3, T6 are pnp transistors, all having high breakdown voltages. Suitable npn transistors are Model No. FMMT497 available from Zetex Corp. of Oldham, England and suitable pnp transistors are Model No. FMMT597 also available from Zetex Corp.

The +100 volt signal Vs is coupled through a 100 k ohm resistor 70 to a collector terminal of the transistor T1 and through a 100 k ohm resistor 72 to a collector terminal of the transistor T5. The +100 volt signal Vs is also couple directly to the emitter terminal of the transistor T3 and the emitter terminal of the transistor T6. The Vout1 signal is coupled through a 10 k ohm resistor 74 to a base terminal of the transistor T1 and is coupled through a 10 k ohm resistor 76 to a base terminal of the transistor T2. The Vout2 signal is coupled through a 10 k ohm resistor 78 to a base terminal of the transistor T4 and is coupled through a 10 k ohm resistor 80 to a base terminal of the transistor T5.

A collector terminal of the transistor T1 is coupled through a 100 k ohm resistor 82 to a base terminal of the transistor T3, while a collector terminal of the transistor T5 is coupled through a 100 k ohm resistor 84 to the transistor T6. Emitter terminals of T1, T2, T4, T5 are grounded. A collector terminal of the transistor T3 is coupled through a 2 k ohm resistor 86 to the electroluminescent panel lead 18 as is a collector terminal of the transistor T4 through a 2 k ohm resistor 88. A collector terminal of the transistor T2 is coupled through a 2 k ohm resistor 90 to the electroluminescent panel lead 20 as is a collector terminal of the transistor T6. The electroluminescent panel 10 functions as a large capacitor.

As can best be seen in FIG. 3, since the 555 timer 60 has a frequency of 500 Hz, a period is 0.002 seconds. When the output of the 555 timer 60 is high, all of the transistors T1–T6 turn on. Because of the 50% duty cycle, the transistors T1–T6 are on for 0.001 seconds and off for 0.001 seconds each period. When the transistors turn on, the electroluminescent panel electrode 14 is charged to a voltage, labeled VE1 at lead 18, of substantially +100 volts while the electroluminescent panel electrode 16 is charged to a voltage, labeled VE2 at lead 20, of substantially –100 volts. Thus, the peak-to-peak voltage across the electrodes 14, 16 is substantially 200 volts.

The voltage buildup across the electrodes 14, 16 follows an exponential increase characteristic of voltage buildup increase across the plates of capacitor subject to a potential difference. The time constant of the effective resistor capacitor (RC) charging circuit which includes the electroluminescent panel 10 is short enough such that one half of the timer period (0.001 second) corresponds to at least three time constants of the effective RC charging circuit, that is, the electrodes 14, 16 charge almost fully to respective voltages of +100 volts and –100 volts.

When the transistors T1–T6 turn off, the electroluminescent panel electrode voltage VE1 discharges to substantially zero volts, while the electroluminescent panel electrode voltage VE2 also discharges to substantially zero volts. Thus, the waveforms of the VE1 and VE2 are synchronized substantially square wave waveforms having an effective peak-to-peak voltage magnitude of 200 volts.

While the present invention has been described with a degree of particularity, it is the intent that the invention include all modifications and alterations from the disclosed design falling within the spirit and scope of the appended claims.

I claim:

1. A circuit for energizing an electroluminescent panel of a portable data collection device, the electroluminescent panel including a first electrode and a spaced apart second electrode, the circuit comprising:
   a) a voltage step up circuit including:
      i) a switching regulation circuit coupled to a regulated power supply and receiving as an input from the power supply a low voltage direct current signal and generating a high frequency output signal, the frequency of the output signal being greater than 50,000 Hertz;
      ii) an inductor having a first end coupled to the high frequency output signal of the switching regulation circuit; and
      iii) a capacitor having a first end coupled to a second end of the inductor and a second end coupled to ground, the capacitor smoothing an inductor output signal present at the second end of the inductor, a voltage magnitude of the inductor output signal being greater than a voltage magnitude of the low voltage direct current signal of the power supply;
   b) a switching circuit having an input coupled to the inductor output signal and a first output coupled to the first electrode of the electroluminescent panel and a second output coupled to the second electrode of the electroluminescent panel;
   c) a first time varying output signal being generated at the first output having a voltage magnitude substantially equal to the voltage magnitude of the inductor output signal and varying between a first voltage value and a second voltage value wherein the second voltage value is a more positive voltage value than the first voltage value; and
   d) a second time varying output signal being generated at the second output having a frequency equal to a frequency of the first time varying output signal and having a voltage magnitude substantially equal to the voltage magnitude of the inductor output signal, the second time varying output signal varying between the first voltage value and a third voltage value wherein the third voltage value is a more negative voltage value than the first voltage value.

2. The circuit for energizing an electroluminescent panel of claim 1 wherein the first time varying output signal and the second time varying output signal are synchronized such that the first voltage value of each of the signals occurs at substantially the same time and the second voltage value of the first time varying output signal occurs at substantially the same time as the third voltage value of the second time varying output signal.

3. The circuit for energizing an electroluminescent panel of claim 1 wherein the switching circuit includes:
   a) a timing circuit for generating a timing circuit output signal varying between a positive high voltage state and a low voltage state;
   b) an inverter coupled to the timing circuit output signal and generating an inverted timing circuit output signal; and
   c) a plurality of switches including:
      i) at least one switch coupled to the timing circuit, the inductor output signal and the first electrode;
      ii) at least one switch coupled to the timing circuit output signal, the inductor output signal and the second electrode;
      iii) at least one switch coupled to the inverted timing circuit output signal, the inductor output signal and the first electrode; and
      iv) at least one switch coupled to the inverted timing circuit output signal, the inductor output signal and the second electrode.

4. The circuit for energizing an electroluminescent panel of claim 1 wherein each of the plurality of switches is a transistor.

5. The circuit for energizing an electroluminescent panel of claim 1 wherein the switching regulation circuit is embodied in a switching regulation integrated circuit chip.

6. The circuit for energizing an electroluminescent panel of claim 5 wherein the switching regulation integrated circuit chip is a MAX1771 chip.

7. The circuit for energizing an electroluminescent panel of claim 3 wherein the timing circuit includes a 555 integrated circuit timer.

8. The circuit for energizing an electroluminescent panel of claim 1 wherein the low voltage direct current signal is substantially a positive five volt signal generated by power regulation circuitry of the portable data collection device.

9. The circuit for energizing an electroluminescent panel of claim 1 wherein a voltage magnitude of the inductor output signal is greater than fifty volts.

10. The circuit for energizing an electroluminescent panel of claim 1 wherein the first voltage value of the first and second time varying output signals is substantially zero volts.

11. The circuit for energizing an electroluminescent panel of claim 10 wherein the second voltage value of the first time varying output signal is greater than positive fifty volts.

12. The circuit for energizing an electroluminescent panel of claim 10 wherein the second voltage value of the second time varying output signal is less than negative fifty volts.

* * * * *